US009971609B2

(12) United States Patent
Balakrishnan et al.

(10) Patent No.: US 9,971,609 B2
(45) Date of Patent: May 15, 2018

(54) THERMAL WATCHDOG PROCESS IN HOST COMPUTER MANAGEMENT AND MONITORING

(71) Applicant: AMERICAN MEGATRENDS, INC., Norcross, GA (US)

(72) Inventors: Venkatesan Balakrishnan, Chennai (IN); Padma Devaraj, Chennai (IN); Anand Krishnan Vadivelu, Trichy (IN)

(73) Assignee: AMERICAN MEGATRENDS, INC., Norcross, GA (US)

( * ) Notice: Subject to any disclaimer, the term of this patent is extended or adjusted under 35 U.S.C. 154(b) by 376 days.

(21) Appl. No.: 14/297,310

(22) Filed: Jun. 5, 2014

(65) Prior Publication Data

US 2015/0355651 A1    Dec. 10, 2015

(51) Int. Cl.
*G05D 23/19* (2006.01)
*G06F 9/44* (2018.01)
(Continued)

(52) U.S. Cl.
CPC ............ *G06F 9/442* (2013.01); *G05B 15/02* (2013.01); *G06F 1/20* (2013.01); *G06F 11/30* (2013.01);
(Continued)

(58) Field of Classification Search
CPC ........ G06F 9/442; G06F 11/3058; G06F 1/20; G06F 11/0754
(Continued)

(56) References Cited

U.S. PATENT DOCUMENTS 5,526,289 A * 6/1996 Dinh ...................... G06F 1/206
361/679.02
6,029,119 A * 2/2000 Atkinson ........... G05D 23/1917
702/132

(Continued)

OTHER PUBLICATIONS

—IPMI—Intelligent Platform Management Interface Specification Second Generation v 1.5, rev 1.1, 2002, Intel Hewlett-Packard NEC Dell (Excerpt).*

*Primary Examiner* — Mohammad Ali
*Assistant Examiner* — Joshua Sanders
(74) *Attorney, Agent, or Firm* — Locke Lord LLP; Tim Tingkang Xia, Esq.

(57) ABSTRACT

In an aspect of the disclosure, a method, a computer-readable medium, and an apparatus are provided. The apparatus may be a control system. The control system includes, a BMC managing a host computer, the BMC including a first processor and BMC firmware executed on the first processor, is to monitor temperature readings of a plurality of temperature sensors of the host computer. The control system further includes a thermal watchdog temperature sensor installed at a predetermined location of a host computer and monitoring a working temperature at the predetermined location of the host computer. The control system includes a thermal watchdog module dedicated for the host computer, independent of the BMC firmware, and in communication with the thermal watchdog temperature sensor through a communications link. The thermal watchdog module is configured to retrieve a temperature reading of the thermal watchdog temperature sensor through the communications link.

18 Claims, 6 Drawing Sheets

(51) Int. Cl.
  *G05B 15/02* (2006.01)
  *G06F 1/20* (2006.01)
  *G06F 11/30* (2006.01)

(52) U.S. Cl.
  CPC ...... *G06F 11/3031* (2013.01); *G06F 11/3058* (2013.01); *G06F 2201/81* (2013.01)

(58) Field of Classification Search
  USPC .......................................................... 700/299
  See application file for complete search history.

(56) References Cited

U.S. PATENT DOCUMENTS

| | | | | |
|---|---|---|---|---|
| 6,172,611 | B1* | 1/2001 | Hussain | G06F 1/206 340/584 |
| 6,535,798 | B1* | 3/2003 | Bhatia | G05D 23/1917 327/113 |
| 6,959,258 | B2* | 10/2005 | Smith | G06F 1/206 257/E23.08 |
| 7,167,993 | B1* | 1/2007 | Thomas | G06F 1/203 713/322 |
| 8,150,561 | B2* | 4/2012 | Shimotono | G06F 1/206 700/299 |
| 8,489,250 | B2* | 7/2013 | Aklilu | G05D 23/1917 165/201 |
| 2001/0016789 | A1* | 8/2001 | Staiger | B60R 16/0231 701/1 |
| 2002/0087907 | A1* | 7/2002 | Poisner | G06F 1/206 713/340 |
| 2004/0153786 | A1* | 8/2004 | Johnson | G06F 1/26 714/25 |
| 2004/0267486 | A1* | 12/2004 | Percer | G06F 11/24 702/120 |
| 2005/0021260 | A1* | 1/2005 | Robertson | G01R 31/30 702/75 |
| 2006/0025064 | A1* | 2/2006 | Horner | B64D 13/04 454/74 |
| 2006/0036879 | A1* | 2/2006 | Wahler | G06F 1/206 713/300 |
| 2007/0121492 | A1* | 5/2007 | Johns | G01K 3/005 370/223 |
| 2007/0156370 | A1* | 7/2007 | White | G06F 1/206 702/132 |
| 2007/0260893 | A1* | 11/2007 | Aguilar, Jr. | G06F 1/206 713/300 |
| 2008/0281475 | A1* | 11/2008 | Hirai | G05D 23/1931 700/300 |
| 2008/0294296 | A1* | 11/2008 | Liu | G05D 23/1917 700/300 |
| 2010/0117579 | A1* | 5/2010 | Culbert | G06F 1/20 318/471 |
| 2010/0128387 | A1* | 5/2010 | Sendelbach | G11B 33/144 360/97.12 |
| 2010/0194321 | A1* | 8/2010 | Artman | G06F 1/206 318/454 |
| 2012/0155025 | A1* | 6/2012 | Bourgeois | H01M 10/399 361/694 |
| 2013/0090889 | A1* | 4/2013 | Vaidyanathan | G01K 1/024 702/136 |
| 2013/0258574 | A1* | 10/2013 | Pamley | G06F 1/206 361/679.31 |
| 2014/0006818 | A1* | 1/2014 | Doshi | G06F 1/3203 713/320 |
| 2014/0181562 | A1* | 6/2014 | Das | G06F 1/206 713/324 |
| 2015/0005949 | A1* | 1/2015 | Haridass | G06F 1/206 700/275 |

* cited by examiner

US 9,971,609 B2

THERMAL WATCHDOG PROCESS IN HOST COMPUTER MANAGEMENT AND MONITORING

FIELD

The present disclosure generally relates to host computer monitoring and management, and more particularly to independent thermal watchdog processes in addition to the watchdog process of a Baseboard Management Controller (hereinafter BMC) operating system.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Generally, the term "computer system" refers to either a stand-alone system or a number of interconnected systems, such as, for instance, a client-server network. Regardless of the implementation, the various components making up a computer system typically operate within a range of parameters defined by performance protocols or standards. For instance, the operating temperature of a computer CPU is often monitored in order to detect periods in time when the system may rise above a certain predetermined temperature reading. Other forms of information that may be monitored within a computer system include, without limitation, voltages associated with semiconductor components located on the baseboard of the system, velocity (e.g., rpm) of cooling fans located on or near the CPU.

Therefore, heretofore unaddressed needs still exist in the art to address the aforementioned deficiencies and inadequacies.

SUMMARY

In one aspect, the present disclosure relates to a control system. In certain embodiments, the control system includes: (a) a thermal watchdog temperature sensor, and (b) a thermal watchdog module. The thermal watchdog temperature sensor is installed at a predetermined location of a host computer and monitoring a working temperature at the predetermined location of the host computer. The thermal watchdog module is independent of a baseboard management controller (BMC) firmware of the host computer, and the thermal watchdog module is in communication with the thermal watchdog temperature sensor through a communications link. The thermal watchdog module is configured to (a) retrieve a temperature reading of the thermal watchdog temperature sensor in a predetermined interval through the communications link, (b) determine if the temperature reading exceeds a predetermined temperature threshold, and (c) in response to determining that the temperature reading exceeds the predetermined temperature threshold, send control commands to shut down the host computer.

In certain embodiments, the communications link includes at least one of: an $I^2C$ bus, and a system management bus (SMBus). The thermal watchdog temperature sensor is dedicated to the thermal watchdog module. The dedicated thermal watchdog temperature sensor includes at least one of: a host computer CPU operating temperature sensor, a host computer graphic processor temperature sensor, and a host computer power supply temperature sensor.

In one embodiment, the thermal watchdog module is implemented as firmware and the thermal watchdog module and BMC firmware are executed on a first processor of the BMC. The thermal watchdog module includes computer executable instructions, control commands and control data configured in accordance with communications link specification. When the computer executable instructions are executed on the first processor of the BMC, the computer executable instructions perform following operations: (a) establishing communication with the dedicated thermal watchdog temperature sensor at the start up using the communications link over a management bus, (b) at a preset time interval according a watchdog timer, retrieving a temperature reading of the thermal watchdog temperature sensor, (c) comparing the temperature reading of the thermal watchdog temperature sensor retrieved to a predetermined temperature threshold, (d) sending control commands to take corrective actions to reduce the operating temperature of the host computer, if the temperature reading of the thermal watchdog temperature sensor retrieved exceeds the predetermined temperature threshold, and (e) sending control commands to instruct the host computer to shut down, if temperature reading of the thermal watchdog temperature sensor retrieved exceeds the predetermined temperature threshold, and the corrective actions fail to correct the overheating.

In certain embodiments, the corrective actions include: (a) checking if all cooling fans installed on the host computer are working at their maximum capacity, and (b) rebooting the host computer to allow the rebooting of the host computer to correct the overheating. If some or all of the cooling fans of the host computer are not operating at their maximum capacity, the thermal watchdog module sends control commands to the BMC to increase the speed of all cooling fans to their maximum capacity. If the number of reboots does not exceed a predetermined number of reboots, the thermal watchdog module sends control commands to the BMC to reboot the host computer. Other corrective actions may include: (c) if the power supply voltage of the host computer CPU is not at its lowest operating limit, the thermal watchdog module sends control commands to the BMC to reduce the power supply voltage of the host computer CPU, and (d) if the clock rate of the host computer CPU is not at its lowest operating limit, the thermal watchdog module sends control commands to the BMC to reduce the clock rate of the host computer CPU.

In another embodiment, the thermal watchdog module includes a second processor, computer executable instructions, control commands and control data configured in accordance with communications link specification. When the computer executable instructions are executed on the second processor, the computer executable instructions perform following operations: (a) establishing communication with the dedicated thermal watchdog temperature sensor at the start up using the communications link over a management bus, (b) at a preset time interval according a watchdog timer, retrieving a temperature reading of the thermal watchdog temperature sensor, (c) comparing the temperature reading of the thermal watchdog temperature sensor retrieved to a predetermined temperature threshold, (d) sending control commands to take corrective actions to reduce the operating temperature of the host computer, if the temperature reading of the thermal watchdog temperature sensor retrieved exceeds the predetermined temperature threshold, and (e) sending control commands to instruct the host computer to shut down, if temperature reading of the thermal watchdog temperature sensor retrieved exceeds the predetermined temperature threshold, and the corrective actions fail to correct the overheating.

In certain embodiments, the temperature reading of dedicated thermal watchdog temperature sensor is retrieved using IPMI communication protocol. The control commands sent to the host computer are IPMI control commands, and the IPMI control commands include extended OEM IPMI commands. The predetermined location of the host computer includes: a location adjacent to a CPU of the host computer, a location adjacent to a graphical processor of the host computer, a location adjacent to a power supply of the host computer, and a location adjacent to a temperature sensitive area designated by the manufacture of the host computer.

In another aspect, the present disclosure relates to a computer-implemented method of a thermal watchdog module for monitoring operating temperature of a host computer with temperature sensors and at least one dedicated thermal watchdog temperature sensor, and controlling the operation of the host computer. The computer-implemented method includes following operations: (a) establishing communication with the at least one dedicated thermal watchdog temperature sensor at the start up using a communication protocol over a communications link, (b) at a preset time interval according a watchdog timer, retrieving a temperature reading of the thermal watchdog temperature sensor, (c) comparing the temperature reading of the thermal watchdog temperature sensor retrieved to a predetermined temperature threshold, (d) sending control commands to take corrective actions to reduce the operating temperature of the host computer, if the temperature reading of the thermal watchdog temperature sensor retrieved exceeds the predetermined temperature threshold, and (e) sending control commands to instruct the host computer to shut down, if temperature reading of the thermal watchdog temperature sensor retrieved exceeds the predetermined temperature threshold, and the corrective actions fail to correct the overheating. The communication protocol includes IPMI communication protocol. The control commands include IPMI control commands, and the IPMI control commands include extended OEM IPMI commands. The corrective actions may include at least one of: (a) checking if all cooling fans installed on the host computer are working at their maximum capacity, and if some or all cooling fans of the host computer are not operating at their maximum capacity, the thermal watchdog module sends control commands to the BMC to increase the speed of all cooling fans to their maximum capacity, (b) if the number of reboots does not exceed a predetermined number of reboots, the thermal watchdog module sends control commands to the BMC to reboot the host computer to allow the rebooting of the host computer to correct the overheating, (c) if the power supply voltage of the host computer CPU is not at its lowest operating limit, the thermal watchdog module sends control commands to the BMC to reduce the power supply voltage of the host computer CPU, and (d) if the clock rate of the host computer CPU is not at its lowest operating limit, the thermal watchdog module sends control commands to the BMC to reduce the clock rate of the host computer CPU.

In yet another aspect, the present disclosure relates to a non-transitory computer storage medium. The non-transitory computer storage medium stores computer-executable instructions. When executed by a processor of a thermal watchdog module, cause the processor to: (a) establish communication with at least one dedicated thermal watchdog temperature sensor at the start up using IPMI communication protocol over a communications link, (b) at a preset time interval according a watchdog timer, retrieve a temperature reading of the thermal watchdog temperature sensor, (c) compare the temperature reading of the thermal watchdog temperature sensor retrieved to a predetermined temperature threshold, (d) send IPMI control commands to take corrective actions to reduce the operating temperature of the host computer, if the temperature reading of the thermal watchdog temperature sensor retrieved exceeds the predetermined temperature threshold, and (e) send IPMI control commands to instruct the host computer to shut down, if temperature reading of the thermal watchdog temperature sensor retrieved exceeds the predetermined temperature threshold, and the corrective actions fail to correct the overheating. The corrective actions includes at least one of: (a) checking if all cooling fans installed on the host computer are working at their maximum capacity, and if some or all cooling fans of the host computer are not operating at their maximum capacity, the thermal watchdog module sends control commands to the BMC to increase the speed of all cooling fans to their maximum capacity, (b) if the number of reboots does not exceed a predetermined number of reboots, the thermal watchdog module sends control commands to the BMC to reboot the host computer to allow the rebooting of the host computer to correct the overheating, (c) if the power supply voltage of the host computer CPU is not at its lowest operating limit, the thermal watchdog module sends control commands to the BMC to reduce the power supply voltage of the host computer CPU, and (d) if the clock rate of the host computer CPU is not at its lowest operating limit, the thermal watchdog module sends control commands to the BMC to reduce the clock rate of the host computer CPU.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
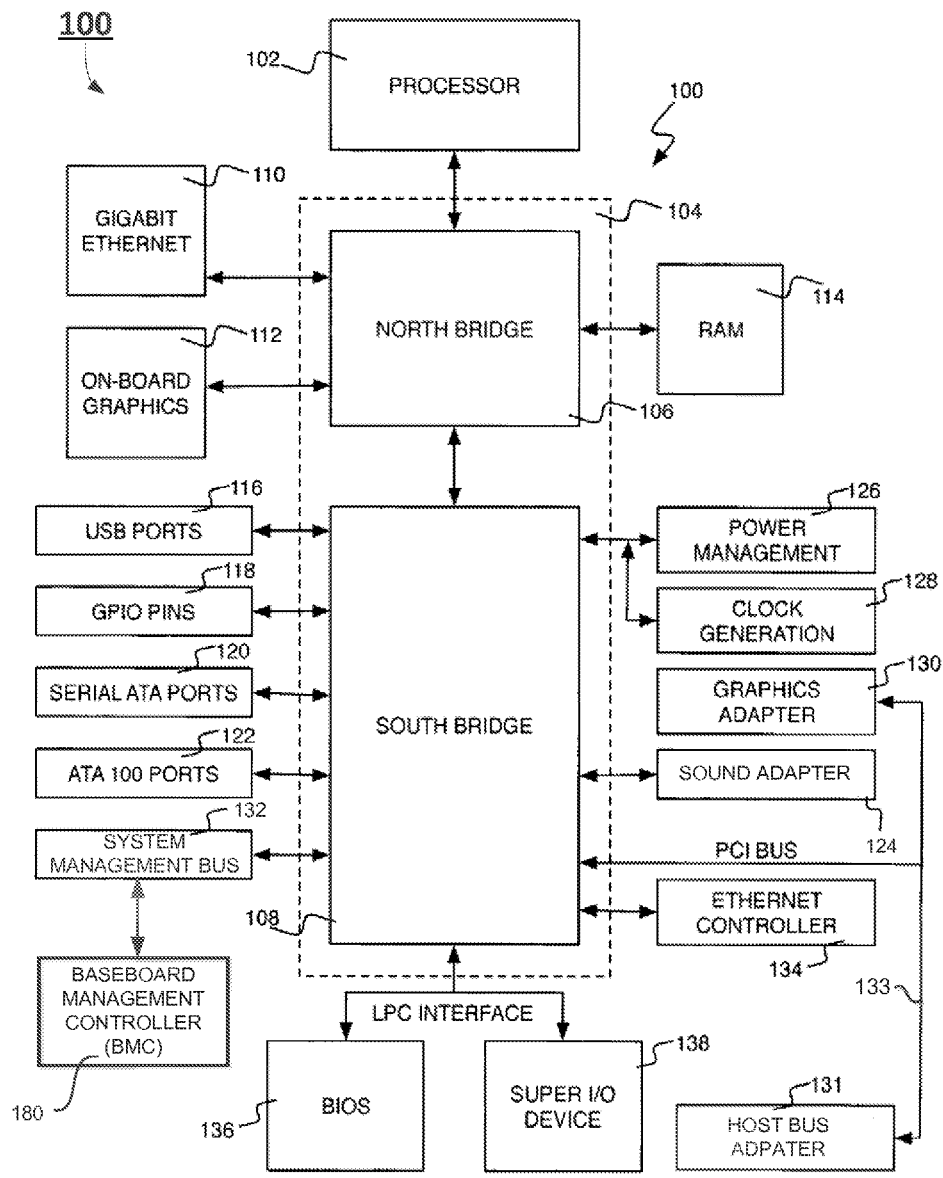
FIG. 1 schematically shows a computer architecture diagram showing aspects of a computer utilized as an illustrative operating environment for the various embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

In a computer system, various types of sensors can be used to detect operating and performance-related parameters associated with the computer system and its constituent components. These sensors include thermostats, voltage meters and tachometers. A computer system typically employs one or more management modules to assist in the collection and analysis of information sensed by the various sensors measuring operating and performance-related parameters within the system. These management modules may be either software or hardware components, but typically encompass both hardware and software components. One such management module is referred to as a BMC. The BMC is a microcontroller integrated into the baseboard (also known in the industry as the "motherboard") of the computer system and having a specified number of contact pins through which information sensed by various sensors is received for analysis by the BMC. In order to perform this analysis, the BMC is programmed with firmware for implementing procedures relating to system monitoring and recovery. With this firmware, the BMC is programmed to monitor various operating and performance-related parameters sensed within a computer system and to analyze this information to determine whether any of the sensed parameters are currently outside of an expected or recommended operating range.

The computer system relies on the BMC to monitor and manage these parameters using an intelligent platform management interface (hereinafter IPMI) protocol. Currently, the BMC runs on two different operating systems. One is non real-time operating system (RTOS). The other one is the real-time operating system. When the BMC is running on the non RTOS, if a host computer CPU operating temperature monitoring process is killed or stalled, the host computer CPU operating temperature monitoring process will not function properly. Under this circumstance, one process failure is not attributed to the system failure, and watchdog will not trigger a BMC system reboot to correct this failure. If the failure is not corrected for a long period of time, the host computer CPU loses overheating protection and may be put in high risk. When the BMC is running on the RTOS, if a host computer CPU operating temperature monitoring process is killed or stalled, the host computer CPU operating temperature monitoring process may be rebooted by a watchdog process. Either way, it is still possible for the BMC to malfunction and lose overheat protection. It is desirable to have an independent thermal watchdog module that does not rely on the thermal monitoring process run on the BMC so that when the thermal monitoring process on the BMC malfunctions, the independent thermal watchdog module can still function properly, monitor the operating temperature of the host computer CPU, and increase the speed of the host computer CPU cooling fan when needed, and shut down the host computer CPU gracefully if the host computer CPU overheating condition is detected.

FIG. 1 and the following discussion are intended to provide a brief, general description of a suitable computing environment in which the present disclosure may be implemented. Generally, program modules include routines, programs, components, data structures, and other types of structures that perform particular tasks or implement particular abstract data types. Moreover, those skilled in the art will appreciate that the present disclosure may be practiced with other computer system configurations, including handheld devices, multiprocessor systems, microprocessor-based or programmable consumer electronics, minicomputers, mainframe computers, and the like. The present disclosure may also be practiced in distributed computing environments where tasks are performed by remote processing devices that are linked through a communications network. In a distributed computing environment, program modules may be located in both local and remote memory storage devices.

Referring now to FIG. 1, details regarding an illustrative operating environment for embodiments of the present disclosure will be provided. In particular, FIG. 1 illustrates a computer configuration for practicing the embodiments of the present disclosure. It should be appreciated, however, that although the embodiments of the present disclosure described herein are discussed in the context of a conventional desktop or host computer, the embodiments of the present disclosure may be utilized with virtually any type of computing device.

FIG. 1 illustrates a host computer 100 that, as will be described in greater detail below, may utilize baseboard management controller (BMC) 180 to monitor and manage the operation of the host computer. In order to provide the monitoring and management functionalities, the host computer 100 includes a baseboard, or "motherboard", which is a printed circuit board to which a multitude of components or devices may be connected by way of a system bus or other electrical communication path. In one illustrative embodiment, a processor ("processor" or "CPU") 102 operates in conjunction with a chipset 104. The CPU 102 is a standard central processor that performs arithmetic and logical operations necessary for the operation of the host computer 100.

In certain embodiments, the host computer 100 may be a regular computer or a special purpose computer also with network connectivity. In certain embodiments, the host computer 100 includes one or more operating systems as well as one or more application programs. The operating system has a set of programs that control operations of the host computer 100. The set of application programs, inclusive of certain utility programs, may also provide a graphical user interface to the user. The operating system is operable to multitask, i.e., execute computing tasks in multiple threads, and thus may be any of the following: MICROSOFT CORPORATION's "WINDOWS XP" or "WINDOWS NT", "WINDOWS Vista,", "WINDOWS 7," and "WINDOWS 8," operating systems, IBM's OS/2 WARP, APPLE's MACINTOSH OSX operating system, LINUX, UNIX, etc. The web browser can be one of: SAFARI, CHROME, FIREFOX, and INTERNET EXPLORER.

The chipset 104 includes a north bridge 106 and a south bridge 108. The north bridge 106 provides an interface between the CPU 102 and the remainder of the host computer 100. The north bridge 106 also provides an interface to the random access memory ("RAM") 114 and, possibly, an on-board graphics adapter 112. The north bridge 106 may also include functionality for providing networking functionality through a gigabit Ethernet adapter 110. A gigabit Ethernet adapter 110 is capable of connecting the host computer 100 to another computer via a network. Connections which may be made by the network adapter 110 may include local area network ("LAN"), wide area network ("WAN") or Wi-Fi connections. LAN, WAN and Wi-Fi networking environments are commonplace in offices, enterprise-wide computer networks, intranets, and the Internet. The north bridge 106 is connected to the south bridge 108.

The south bridge 108 is responsible for controlling many of the input/output functions of the host computer 100. In particular, the south bridge 108 may provide one or more universal serial bus ("USB") ports 116, a sound adapter 124, an Ethernet controller 134, and one or more general purpose input/output ("GPIO") pins 118. The south bridge 108 may also provide a system management bus 132 for use in managing the various components of the host computer 100. Power management circuitry 126 and clock generation circuitry 128 may also be utilized during the operation of the south bridge 108. The south bridge 108 may also provide a bus for interfacing peripheral card devices such as a graphics adapter 130. In one embodiment, the bus comprises a peripheral component interconnect ("PCI") bus 133. The PCI bus 133 may also be utilized to interface with one or more host bus adapters (HBAs), such as the SATA or SAS HBA 131. As described in greater detail below, the HBA 131 may be connected to a backplane for providing backplane management functionality.

According to one embodiment, the south bridge 108 includes a serial advanced technology attachment ("ATA") adapter for providing one or more serial ATA ports 120 and an ATA 100 adapter for providing one or more ATA 100 ports 122. The serial ATA ports 120 and the ATA 100 ports 122 may be, in turn, connected directly to one or more mass storage devices storing an operating system and application programs. As known to those skilled in the art, an operating system comprises a set of programs that control operations of a computer and allocation of resources. An application program is software that runs on top of the operating system software and uses computer resources made available through the operating system to perform application specific tasks desired by the user. Alternatively, the serial ATA ports 120 may be connected to a backplane for providing backplane management functionality.

The mass storage devices connected to the south bridge 108, and its associated computer-readable media provide non-volatile storage for the host computer 100. Although the description of computer-readable media contained herein refers to a mass storage device, such as a hard disk or CD-ROM drive, it should be appreciated by those skilled in the art that computer-readable media can be any available media that can be accessed by the host computer 100. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 108 for connecting a "Super I/O" device 138. The Super I/O device 138 is responsible for providing a number of input/output ports, including a keyboard port, a mouse port, a serial interface, a parallel port, and other types of input/output ports. The LPC interface may also connect a read-only memory ("ROM") device for storing a basic input/output system ("BIOS") 136 of an extensible firmware interface ("EFI") compatible firmware that includes program code containing the basic routines that help to start up the host computer 100 and to transfer information between elements within the host computer 100. It should be appreciated that the host computer 100 may include other types of computing devices, including hand-held computers, embedded computer systems, personal digital assistants, and other types of computing devices known to those skilled in the art.

In general, the BMC 180 is a microcontroller that monitors operation of a computer system. In FIG. 1, the BMC 180 is in communication with the host computer 100 through the system management bus 132. In a more specific embodiment, the BMC 180 monitors health-related aspects associated with the host computer 100, such as, without limitation, temperature of components within the computer system chassis, speed of rotational components (e.g., spindle motor, CPU fan, etc.) within the system, voltage across or being applied to one or more components within the system and available or used capacity of memory devices within the computer system. Different types of sensors built into the computer system report to the BMC 180 on parameters such as temperature, cooling fan speeds, power status, operating system (OS) status, etc. The BMC 180 monitors the sensors and can send alerts to a system administrator via the network if any of the parameters do not stay within preset limits, indicating a potential failure of the system. The administrator can also remotely communicate with the BMC 180 to take some corrective action such as resetting or power cycling the system to get a hung OS running again. These abilities ensure the host computer system operating properly.

To accomplish the above-noted, and other, monitoring functions, controlling USB media and virtual media, and other functions, the BMC 180 is communicatively connected to one or more components either directly or by way of a management bus 132. In certain embodiments, these components include sensor devices for measuring various operating and performance-related parameters within the computer system. The sensor devices may be either hardware or software base components configured or programmed to measure or detect one or more of the various operating and performance-related parameters. In a management bus, the component that initiates communication on a bus is referred to a master and the component to which the communication is sent is referred to a slave. The BMC 180 functions as the master on the management bus in most circumstances, but may also function as a slave in other circumstances. Each of the various components communicatively connected to the BMC by way of the management bus is addressed using a slave address.

The management bus 132 can be used by the BMC to request and receive various operating and performance related parameters from the one or more components also communicatively connected to the management bus. In certain embodiments, the management bus 132 communicatively connects the BMC to a CPU temperature sensor and a CPU fan (not shown), thereby providing a means for the BMC to monitor and/or control operation of these components. Other components may include, without limitation, tachometers, heat sensors, voltage meters, amp meters, and digital and analog sensors (not shown). In an embodiment, the management bus is an $I^2C$® bus, which is manufactured by Phillips Semiconductors® and described in detail in the $I^2C$® bus Specification, version 2.1 (January 2000).

The firmware of the BMC 180 can implements Intelligent Platform Management Interface (IPMI) industry standard for system monitoring and event recovery. The IPMI standard is well-known to those of ordinary skill in the industry, and therefore not described in detail herein. Rather, revision 1.1 of the IPMI Specification, version 1.5, release date Feb. 20, 2002, is incorporated by reference. In addition to the normal functions such as IPMI, the firmware can include many customized features such as USB media, SMASH, other individual devices operating on computers, IP V6, and virtual media, and virtual keyboard etc.

It is also contemplated that the host computer 100 may not include all of the components shown in FIG. 1, may include other components that are not explicitly shown in FIG. 1, or may utilize an architecture completely different than that shown in FIG. 1.

Figure 2:
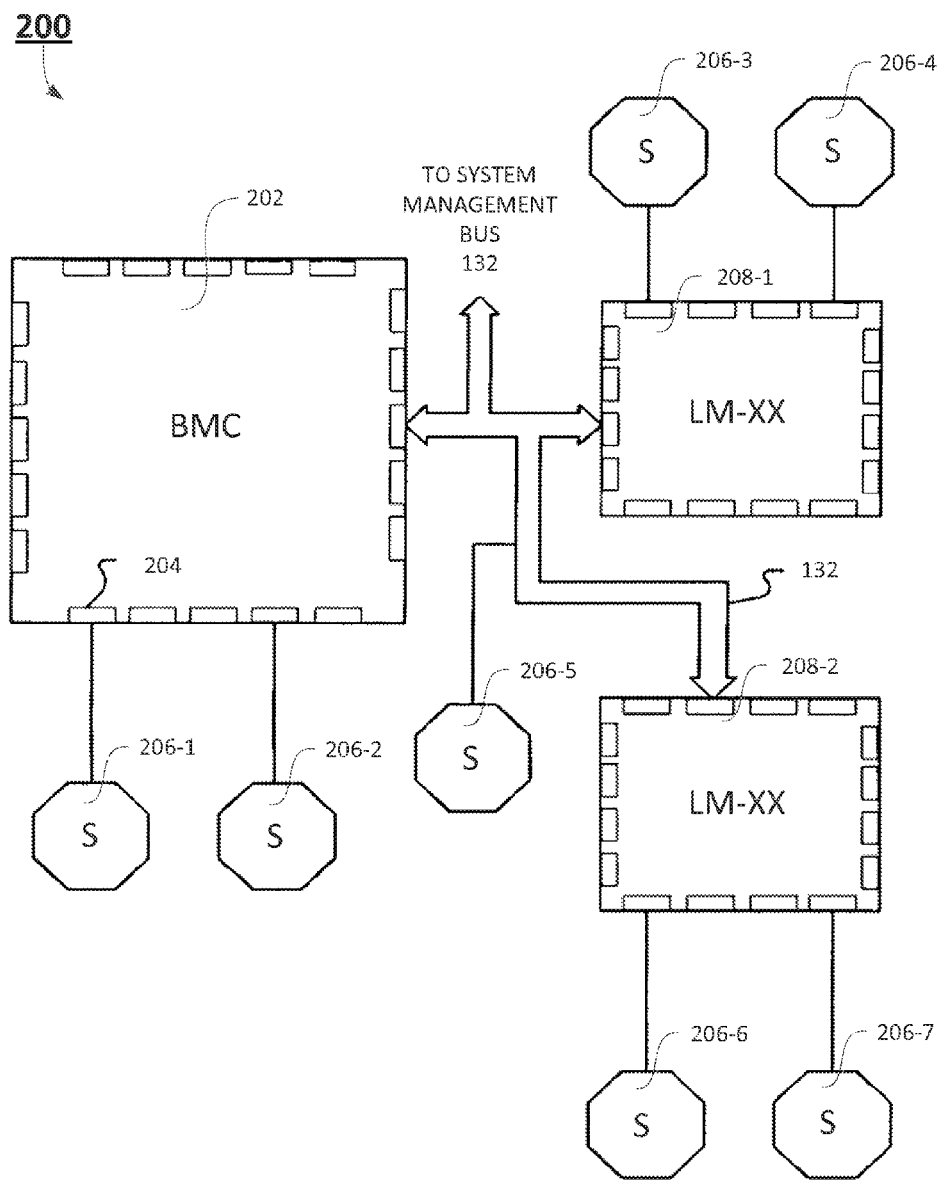
FIG. 2 illustrates a number of sensors and sensor aggregators communicatively connected to a BMC according to certain embodiments of the present disclosure.

Referring now to FIG. 2, an exemplary configuration 200 of sensor devices communicatively connected to a BMC 202 is shown in accordance with an embodiment of the present disclosure. The sensor devices include various types of sensors (206-1, 206-2, 206-3, 206-4, 206-5, 206-6, and 206-7) and sensor aggregation components 208-1, 208-2. The sensors 206 measure or sense operating and performance-related parameters associated with the computer system. The sensor aggregation components 208 receive this information sensed by the sensors 206 and provide this information to the BMC for analysis, and more particularly, for determination on whether an "event" is occurring within the computer system.

The sensor aggregation components 208-1, and 208-2 are shown in FIG. 2 as LM-XX devices (e.g., LM-78 and LM-85 model logic components), but may be any type of hardware and/or software component capable of receiving sensed information and managing the delivery of this information to the BMC 202. Alternatively, the sensor aggregation components 208 may be operable to not only collect and forward sensed information, but also to analyze the sensed information to render advice on the parameters being monitored by the sensors 206. Even further, the sensor aggregation components 208 may be programmed with firmware operable to perform sensing and measuring functions substantially similar to those functions performed by the sensors 206.

As shown in FIG. 2, sensor devices (e.g., 208 and 206) are connected to, and therefore communicate with, the BMC by way of contact pins 204 located on the BMC 202. The sensor devices (e.g., 208, 206) may be connected to the BMC contact pins 204 either directly or by way of the management bus 132 as shown in FIG. 1. Regardless of the implementation, the functionality of these sensor devices is the same: the sensors 206 sense or measure information and subsequently transmit this information to either the BMC or a sensor aggregation component 208; if to the sensor aggregation component 208, then the information is passed by the sensor aggregation component 208 to the BMC 202. The BMC then analyzes the information sensed by these sensor components (e.g., 208, 206) and either 1) issues an alert that an event is occurring; and/or (2) controls operation of one or more components within the computer system based on the determination that an event is taking place.

While the sensors 206 are described in general terms when describing FIG. 2, it should be appreciated that these sensors 206 may be digital or analog sensors that sense any type of information. For example, the sensors 206 may sense, without limitation, temperature of a component (e.g., a CPU) of the host computer 100, temperature within the chassis of the computer system, a voltage and/or current reading associated with a component of the computer system, or velocity and/or acceleration of a component (e.g., spindle motor, etc.) of the computer system. It is also contemplated that the sensors 206 may implemented as a software/firmware routine that senses information related to events associated with operation of either firmware or software modules implemented on the computer system. One such sensor 206 may be a software routine for detecting whether a particular software application program is "locked up," and therefore not operating properly.

Host computer board thermal management is one of major activities performed by BMC firmware, as per industrial standards this activity is taken care by Intelligent Platform Management Interface (IPMI). IPMI regulates the speed of fans associated with the host computer by monitoring the temperature readings from the sensors; this prevents the host computer components from getting heated up under critical conditions. When this functionality is deployed in a non real-time operating system environment where there will be no implicit realization of process state, certain processes may stall, terminate, or fail. If some of the key thermal monitoring processes become one of these failed processes, such failures allow the host computer hardware to become vulnerable to heat, and may put the host computer hardware in danger of overheat, or even cause permanent damage to the host computer system. Therefore, it is desirable to have an additional thermal watchdog process/module independent of the BMC thermal monitoring process to monitor the host computer CPU operating temperature, and take corrective actions if overheating condition is detected. Such additional thermal watchdog process/module ascertains that the host computer CPU is only operating in proper temperature range, and will be shut down if the overheat condition is detected regardless whether the thermal monitoring process of the BMC is working properly.

In one aspect, the present disclosure relates to a thermal watchdog module for monitoring operating temperature of a host computer CPU. The thermal watchdog module will be described in two different implementations.

Figure 3:
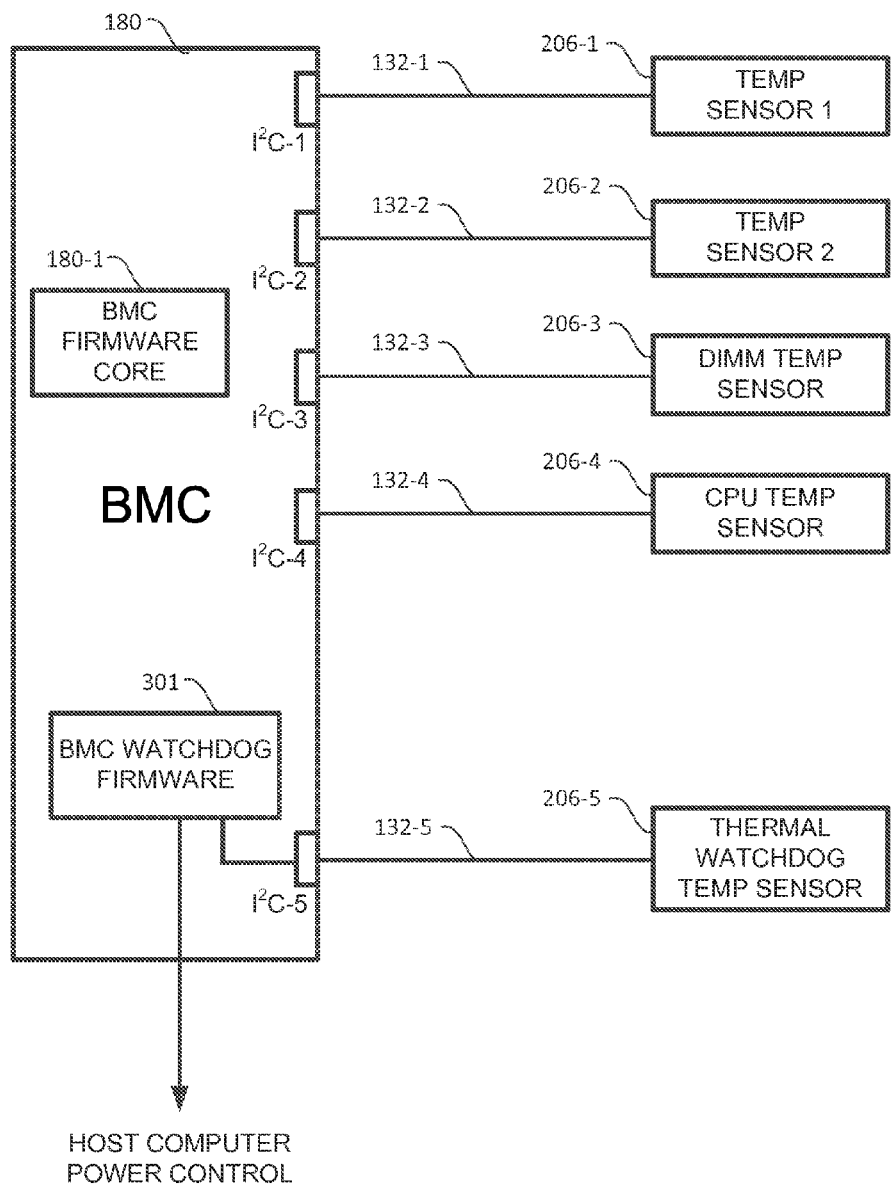
FIG. 3 shows a block diagram illustrating a software implemented thermal watchdog module for monitoring operating temperature and cooling fan speed of a host computer CPU according to certain embodiments of the present disclosure.

FIG. 3 shows a block diagram illustrating a software implemented thermal watchdog module for monitoring operating temperature and cooling fan speed of a host computer CPU (not shown) according to certain embodiments of the present disclosure. FIG. 3 shows a BMC 180, and a BMC watchdog firmware 301. In one embodiment, the BMC 180 has a number of I$^2$C ports, each of I$^2$C ports is connected to a I$^2$C bus. In the embodiment shown in FIG. 3, there are five I$^2$C ports, I$^2$C-1, I$^2$C-2, I$^2$C-3, I$^2$C-4, and I$^2$C-5. There are also five I$^2$C buses: 132-1, 132-2, 132-3, 132-4, and 132-5 connected to the five I$^2$C ports, respectively. The I$^2$C bus 132-1 is connected to a first temperature sensor 206-1 at a first predetermined location on the host computer 100. The I$^2$C bus 132-2 is connected to a second temperature sensor 206-2 at a second predetermined location on the host computer 100. The I$^2$C bus 132-3 is connected to a dual in-line memory module (DIMM) temperature sensor 206-3 near the DIMM memory module of the host computer 100. The fourth I$^2$C bus 132-4 is connected to a CPU temperature sensor 206-4 near the CPU of the host computer 100. The fifth I$^2$C bus 132-5 is a dedicated thermal watchdog I$^2$C bus and it connected to a dedicated thermal watchdog temperature sensor 206-5 at a third predetermined location on the host computer 100. These predetermined location on the host computer 100 are located near or around certain important components, such as cooling fan, power supply, CPU, and graphics processor etc. The thermal watchdog temperature sensor 206-5 installed on the third predetermined location on the host computer 100 is dedicated to the thermal watchdog. The third predetermined location is allocated by the computer hardware designer and it is placed in the most temperature sensitive locations such as the main CPU of the host computer 100, or the power supply of the host computer 100.

In certain embodiments, the BMC 180 includes a BMC firmware core 180-1. The BMC firmware core 180-1 is configured to monitor all temperature sensors such as 206-1, 206-2, 206-3, and 206-4, except the dedicated thermal watchdog temperature sensor 206-5, and perform BMC functions. IPMI protocol may be used for the communication between the temperature sensors and the BMC 180.

Figure 4:
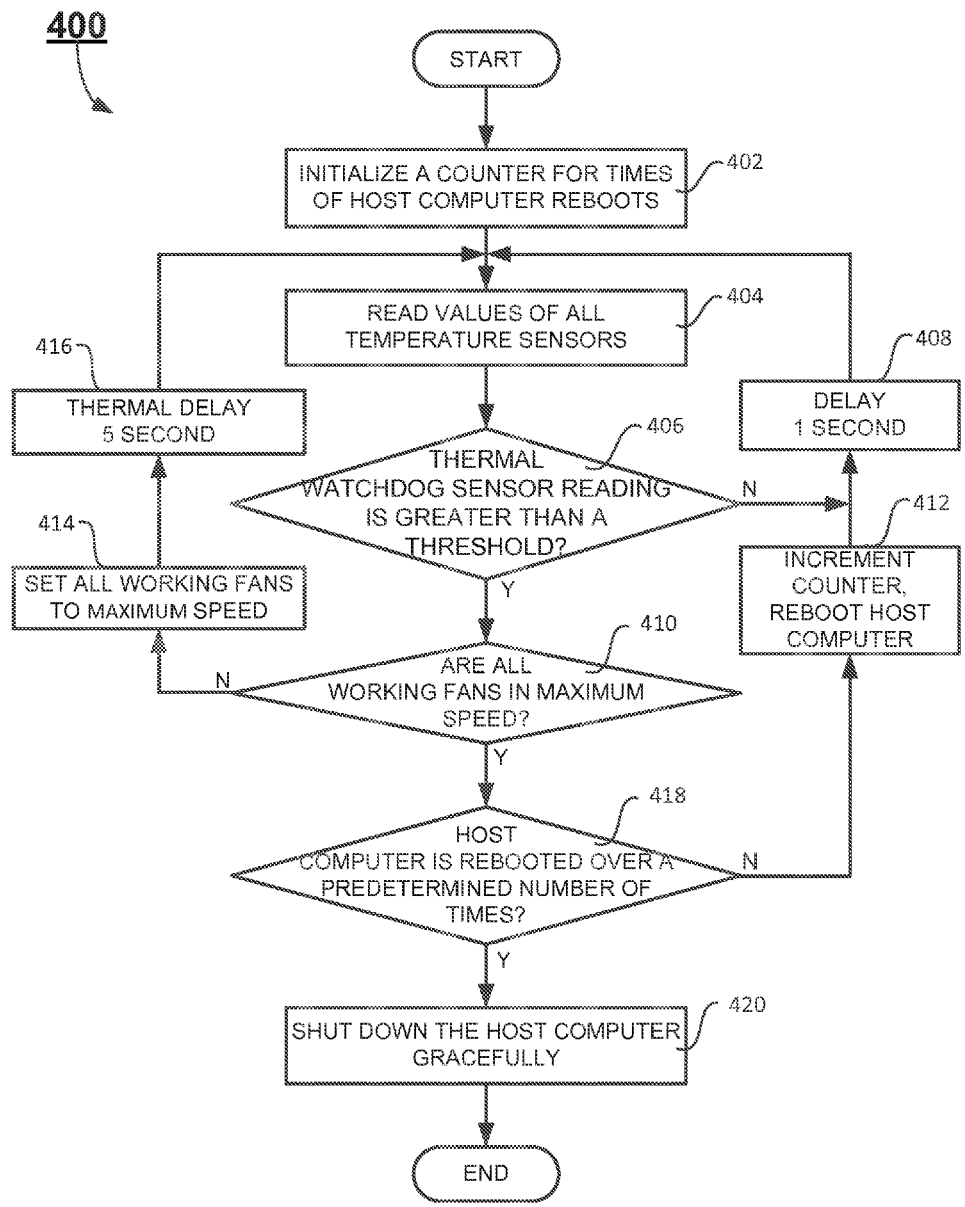
FIG. 4 shows a flow chart illustrating an operation process of a software implemented thermal watchdog module according to one embodiment of the present disclosure.

Referring now to FIG. 4, a flow chart 400 illustrating an operation process of a software implemented thermal watchdog module is shown according to one embodiment of the present disclosure. The BMC 180 also includes a BMC watchdog firmware 301. The BMC watchdog firmware 301 is configured to monitor a dedicated thermal watchdog temperature sensor 206-5 and shut down the host computer 100 if the temperature reading from the dedicated thermal watchdog temperature sensor 206-5 exceeds a predetermined threshold. This is specially designed to protect the host computer 100 in case some or all of the temperature sensors monitored by the BMC 180 fail.

In one embodiment, the BMC watchdog firmware 301 is used to shut down the host computer 100 when the dedicated thermal watchdog temperature sensor 206-5 detects a temperature that exceeds a predetermined catastrophic temperature reading. The BMC watchdog firmware 301 performs one or more of following operations:

At operation 402, the BMC watchdog firmware 301 sets up and initialize a counter for counting the number of times the host computer 100 has been rebooted.

At operation 404, the BMC watchdog firmware 301 receives the temperature reading from the dedicated thermal watchdog temperature sensor 206-5 through the dedicated $I^2C$ bus 132-5. In one embodiment, the BMC watchdog firmware 301 receives the temperature reading from the dedicated thermal watchdog temperature sensor 206-5 through the dedicated $I^2C$ bus 132-5 using standard IPMI communication protocol.

At operation 406, the BMC watchdog firmware 301 compares the temperature reading from the dedicated thermal watchdog temperature sensor 206-5 with a predetermined temperature threshold. The predetermined temperature threshold is setup by an administrator of the host computer 100. For example, for an INTEL CPU in Ivy Bridge microarchitecture, running on default speed with standard coolers, Table 1 below shows Selected INTEL CPU Operating Temperature Ranges under three different conditions:

TABLE 1

Selected INTEL CPU Operating Temperature Ranges

| | Idle Temperature | Normal Temperature | Max Temperature |
|---|---|---|---|
| Core i3-3220 | 28 to 35° C. | 50 to 60° C. | 65° C. |
| Core i5-3570K | 28 to 35° C. | 50 to 62° C. | 67° C. |
| Core i7-3770K | 30 to 40° C. | 50 to 65° C. | 67° C. |

In Table 1, the Max Temperature is defined as Highest safe CPU temperature recommended by INTEL. In order to ensure the safety of the CPU, the predetermined temperature threshold should be set to less than or equal to the Max Temperature.

If the temperature reading from the dedicated thermal watchdog temperature sensor 206-5 is less than the predetermined temperature threshold, the operation process continues to operation 408. If the temperature reading from the dedicated thermal watchdog temperature sensor 206-5 is greater than or equal to the predetermined temperature threshold, the operation process continues to operation 410.

At operation 408, the operation process delays one second and continues to operation 404. In this case, the temperature monitored by the thermal watchdog is within a normal operating range, and host computer 100 is operating normally. The monitoring operating process continues.

At operation 410, the temperature monitored by the thermal watchdog has exceeded the normal operating range, and host computer 100 is operating abnormally. At this time, before the BMC watchdog firmware 301 shuts down the host computer 100, the BMC watchdog firmware 301 checks if all cooling fans are operating at its maximum speed. If the some or all cooling fans are not operating at their maximum capacity, adjust these cooling fans' speed to their maximum capacity. In this case, the operating process continues to operation 414. Otherwise, the operation process continues to operation 418.

At operation 414, the BMC watchdog firmware 301 sets all working cooling fans to their maximum capacity and continues to operation 416.

At operation 416, the BMC watchdog firmware 301 takes 5 second thermal delay to allow the all working cooling fans to reduce the temperature of the host computer 100 in an attempt to correct the overheating issue. After the 5 second delay, the operation process continues to operation 404 to retry.

At operation 418, the BMC watchdog firmware 301 reads the counter and determine if the host computer 100 has been rebooted more than a predetermined number of times as one more attempt to correct the overheating issue. In one embodiment, the predetermined number of times may be set at 5. In another embodiment, the predetermined number of times may be set at 10. This allows the host computer 100 to reboot and correct the overheating issue. If the host computer 100 has been rebooted more than the predetermined number of times, then it is likely the host computer 100 has to be shut down to allow the administrator to examine the host computer 100 to correct the overheating issue and avoid causing permanent damage the host computer 100. In this case, the operating process continues to operation 420 to shut down the host computer 100. If the host computer 100 has been rebooted less than the predetermined number of times, the operating process continues to operation 412.

At operation 412, the BMC watchdog firmware 301 reboots the host computer 100, and increment the counter by one and continues to operation 408 to take a one second delay and continues to operation 404. Rebooting the host computer 100 is one of attempts to correct the overheating issue.

At operation 420, after all the attempts to correct the overheating issue fail, the BMC watchdog firmware 301 has to shut down the host computer 100. The BMC watchdog firmware 301 prepares the host computer 100 for shutting down, notifies the administrator of the host computer of the action to be taken, and proceeds to shut down the host computer 100 gracefully.

In rare occasions, the dedicated thermal watchdog temperature sensor 206-5 may fail, and if this failure is not detected, then, the host computer 100 is still subject to overheating and possibly permanently damage the CPU or other components of the host computer 100. In certain embodiments, the BMC watchdog firmware 301 is used to adjust the cooling fans speed when the dedicated thermal watchdog temperature sensor 206-5 becomes unreadable.

Figure 5:
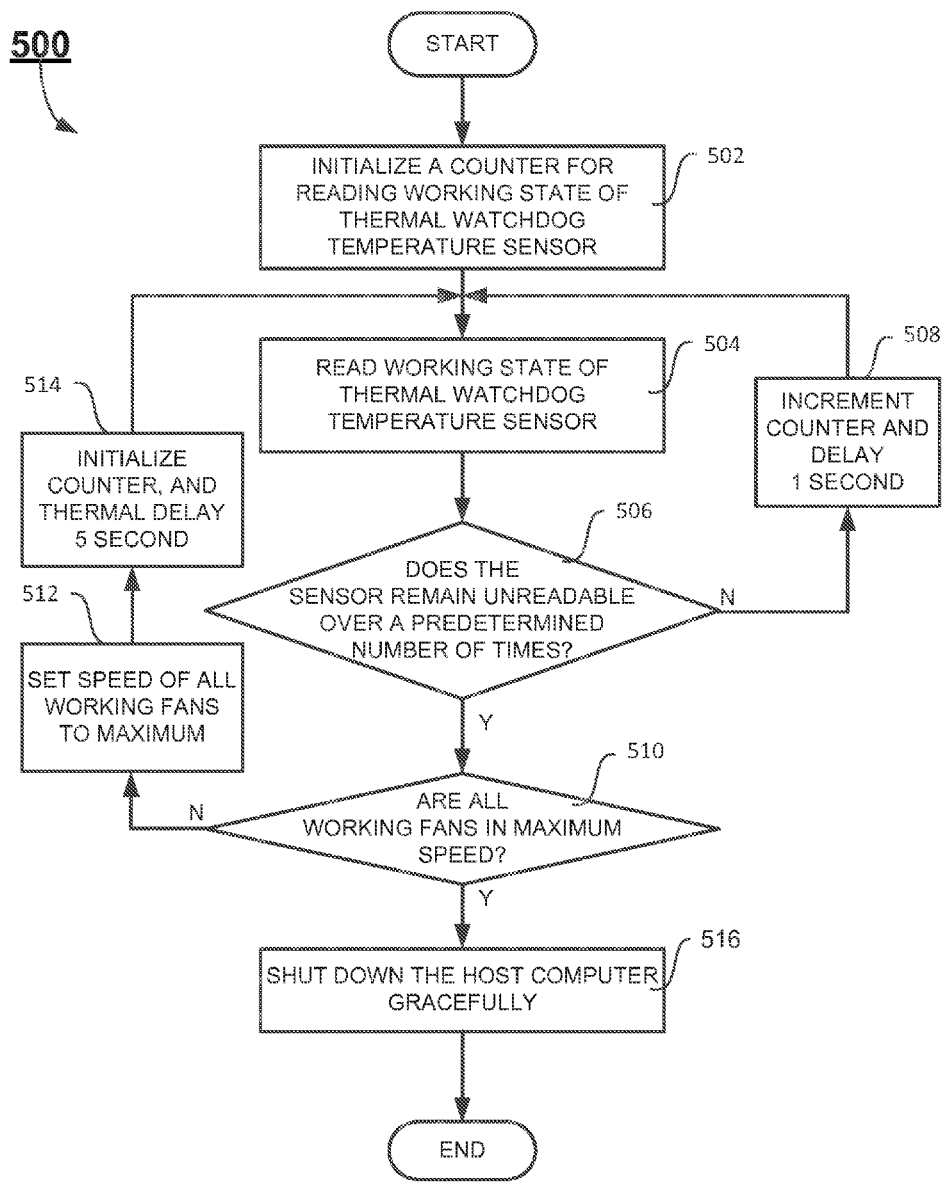
FIG. 5 shows another flow chart illustrating an operation process of a software implemented thermal watchdog module according to one embodiment of the present disclosure.

Referring now to FIG. 5, a flow chart 500 illustrating an operation process of a software implemented thermal watchdog module is shown according to one embodiment of the present disclosure. The BMC watchdog firmware 301 performs one or more of following operations:

At operation 502, the BMC watchdog firmware 301 sets up and initialize a counter for counting the number of the BMC watchdog firmware 301 fail to read the working state of the dedicated thermal watchdog temperature sensor 206-5.

At operation 504, the BMC watchdog firmware 301 reads the working state of the dedicated thermal temperature sensor 206-5. In one embodiment, such reading uses IPMI communication protocol.

At operation 506, the BMC watchdog firmware 301 determines if the dedicated thermal temperature sensor 206-5 remains unreadable more than a predetermined number of time as counted by the counter for counting the number of the BMC watchdog firmware 301 fail to read the working state of the dedicated thermal watchdog temperature sensor 206-5 setup and initialized at operation 502. In one embodiment, the predetermined number of times may be set at 5. In another embodiment, the predetermined number of times may be set at 10. This allows the host computer 100 to give the dedicated thermal watchdog temperature sensor 206-5 sufficient number of times to retry and correct the reading errors.

If the number of retries (the number counted by the counter) is less than the predetermined number of times, the BMC watchdog firmware 301 increments the counter by one, and delay one second and read the working state of the dedicated thermal watchdog temperature sensor 206-5 again by going back to operation 504.

If the number of retries (the number counted by the counter) is more than the predetermined number of times, the operation process continues to operation 510.

At operation 510, the number of retries has exceed the predetermined number of retries set up by the administrator, and host computer 100 can't be monitored by the dedicated thermal watchdog temperature sensor 206-5. At this time, before the BMC watchdog firmware 301 shuts down the host computer 100, the BMC watchdog firmware 301 checks if all cooling fans are operating at its maximum speed. If the some or all cooling fans are not operating at their maximum capacity, adjust these cooling fans' speed to their maximum capacity. In this case, the operating process continues to operation 512 to allow the cooling fans to work in their maximum capacity to see if the dedicated thermal watchdog temperature sensor 206-5 becomes readable after the cooling fans are working in their maximum capacity. Otherwise, the operation process continues to operation 516.

At operation 512, the BMC watchdog firmware 301 sets all working cooling fans to their maximum capacity and continues to operation 514.

At operation 514, the BMC watchdog firmware 301 resets the counter, and takes 5 second thermal delay to allow the all working cooling fans to reduce the temperature of the host computer 100 in an attempt to correct the reading error. After the 5 second delay, the operation process continues to operation 504 to retry.

At operation 516, the BMC watchdog firmware 301 determines that the dedicated thermal watchdog temperature sensor 206-5 has totally failed after all the retries, and the host computer 100 has to be shut down to allow the administrator to examine the host computer 100 to correct the reading errors and avoid causing permanent damage the host computer 100. The BMC watchdog firmware 301 prepares the host computer 100 for shutting down, notifies the administrator of the host computer of the action to be taken, and proceeds to shut down the host computer 100 gracefully.

Figure 6:
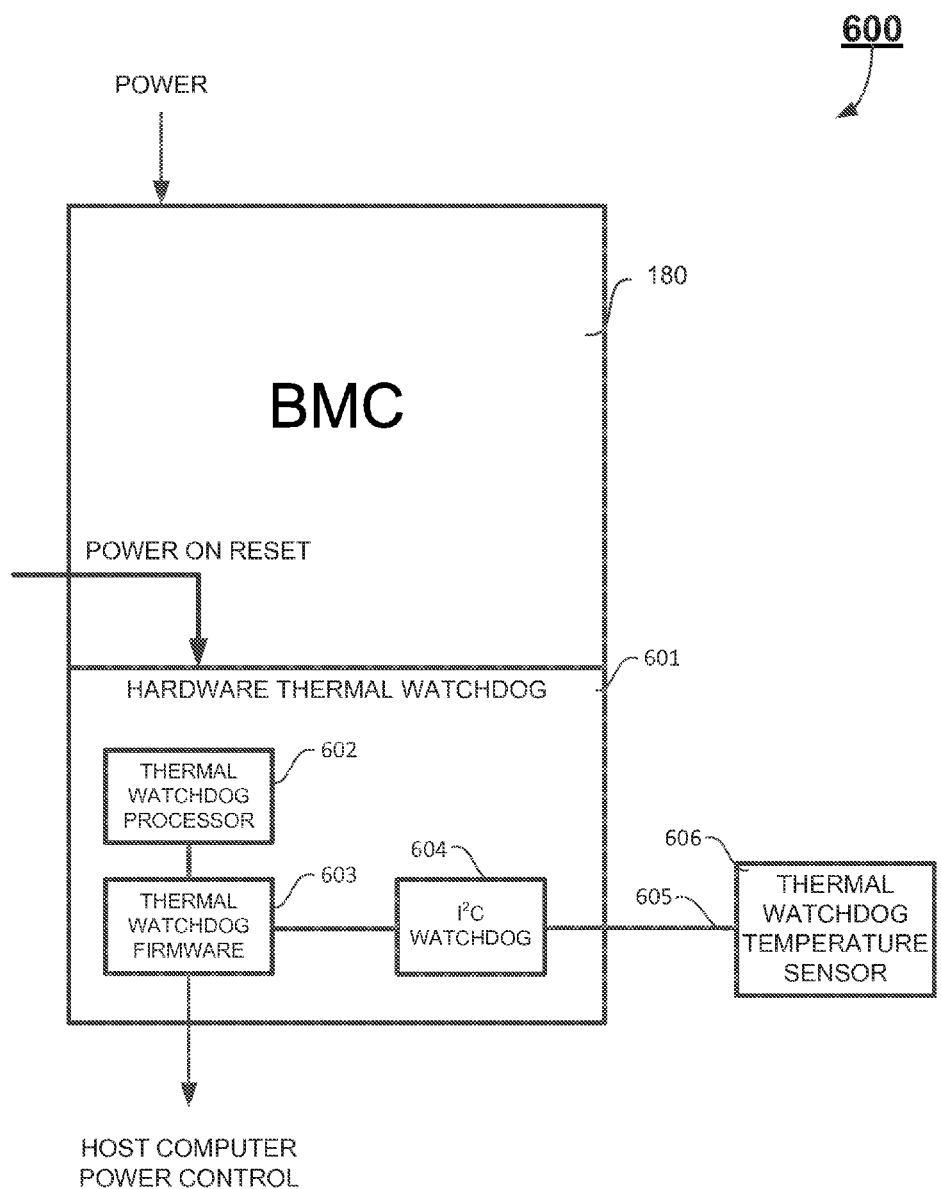
FIG. 6 shows a block diagram illustrating a hardware implemented thermal watchdog module for monitoring a dedicated thermal watchdog temperature sensor of a host computer according to certain embodiments of the present disclosure.

Referring to FIG. 6, a block diagram illustrating a hardware implemented thermal watchdog module 601 for monitoring a dedicated thermal watchdog temperature sensor of a host computer is shown according to certain embodiments of the present disclosure.

In certain embodiments, the hardware implemented thermal watchdog module 601 includes a thermal watch dog processor 602, hardware thermal watchdog firmware 603, an $I^2C$ watchdog 604, an $I^2C$ system management bus 605, and a dedicated thermal watchdog temperature sensor 606. The thermal watch dog processor 602 is not the BMC processor where BMC firmware is executed. The thermal watch dog processor 602 is an independent processor where the hardware thermal watchdog firmware 602 is executed. This is hardware implemented thermal watchdog module 601 runs independent of BMC thermal management operation. If the BMC thermal management operation fails, or the BMC malfunctions, the hardware thermal watchdog module 601 still can detect the working temperature of the host computer, and shuts down the host computer if the host computer overheats.

The hardware thermal watchdog firmware 603 is used to monitor the $I^2C$ watchdog 604, and to shut down the host computer 100 gracefully when the temperature reading from the dedicated thermal watchdog temperature sensor 606 exceeds a predetermined threshold. The $I^2C$ watchdog 604 is used to communicate with the dedicated thermal watchdog temperature sensor 606, and retrieve the temperature reading of the dedicated thermal watchdog temperature sensor 606 in a predetermined time interval according to a watchdog timer (not shown in FIG. 6). The dedicated thermal watchdog temperature sensor 606 is a temperature sensor installed at a predetermined location to monitor the temperature of the predetermined location. The predetermined location may include important components such as the CPU and graphic processor of the host computer 100, and other temperature sensitive area such as cooling fan and power supply of the host computer. The dedicated thermal watchdog temperature sensor 606 is installed on the host computer 100 in addition to a number of temperature sensors such as a CPU temperature sensor, a DIMM temperature sensor, and other temperature sensors arranged on the baseboard of the host computer 100 already monitored by the BMC 180. The hardware thermal watchdog 601 is installed to provide additional safety measure to avoid overheating and causing permanent damages to the host computer 100 in case all the temperature sensors monitored by the BMC 180 fail.

The hardware thermal watchdog 601 is additional hardware provided to the BMC 180 to monitor the dedicated thermal watchdog temperature sensor 606. In certain embodiments, the hardware thermal watchdog 601 starts when the BMC is powered on, or the host computer 100 is powered on. When the $I^2C$ watchdog 604 determines the temperature reading of the dedicated thermal watchdog temperature sensor 606 exceeds a predetermined temperature threshold due to overheating, the thermal watchdog firmware 603 will send instructions to the host computer 100 to shut down the host computer gracefully. The predetermined temperature threshold may be set at or below a maximum temperature allowed by the manufacturer of the host computer 100. For example, if the host computer 100 is a computer using a CPU from Intel, the predetermined temperature threshold may be set at or below 65° C. if the CPU is Core i3-3220, and 67° C. if the CPU is Core i5-3570K or Core i7-3770K.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A control system, comprising:
a thermal watchdog temperature sensor installed at a predetermined location of a host computer and monitoring a working temperature at the predetermined location of the host computer;
a microcontroller, wherein the microcontroller is configured to execute firmware of a baseboard management controller (BMC) and firmware of a thermal watchdog module, wherein microcontroller includes a plurality of communication ports and a first communication port, wherein the thermal watchdog module is dedicated for the host computer and independent of the BMC;
wherein the microcontroller is instructed by the BMC to manage the host computer,
receive temperature readings of a plurality of temperature sensors of the host computer through the plurality of communication ports, and
regulate fans associated with the host computer based on the temperature readings;
wherein the microcontroller is further instructed by the thermal watchdog module to:
communicate with the thermal watchdog temperature sensor through the first communication port,
retrieve a first temperature reading of the thermal watchdog temperature sensor-through the first communication port,
increase a speed of a cooling fan of a host computer CPU,
determine firstly if the first temperature reading exceeds a predetermined temperature threshold; if the first temperature reading does not exceed a predetermined temperature threshold, delay a first predetermined time and perform the step of the receive temperature readings of the plurality of temperature sensors;
in response to determining firstly that the first temperature reading exceeds the predetermined temperature threshold, determine secondly if the speed of the fans is in the maximum speed of the fans; if the speed of the fans is not in the maximum speed of the fans, set the speed of the fans to the maximum speed, delay a second predetermined time longer than the first predetermined time and perform the step of the receive temperature readings of the plurality of temperature sensors;
in response to determining secondly that the speed of the fans is in the maximum speed of the fans, determine thirdly if the host computer is rebooted over a predetermined number of times; if the host computer is not rebooted over the predetermined number of times, increment counter, reboot the host computer, delay the first predetermined time and perform the step of the receive temperature readings of the plurality of temperature sensors; and
in response to determining thirdly that the host computer is rebooted over the predetermined number of times, send control commands to shut down the host computer, wherein the determine firstly, the determine secondly and the determine thirdly are in a sequential order instructed by the microcontroller, and corrective actions to reduce the operating temperature of the host computer fail to correct overheating.

2. The control system of claim 1, wherein the plurality of communication ports and the first communication port each are connected to a communications link.

3. The control system of claim 2, wherein the thermal watchdog temperature sensor is dedicated to the thermal watchdog module, and the thermal watchdog temperature sensor comprises at least one of:
a host computer CPU operating temperature sensor;
a host computer graphic processor temperature sensor; and
a host computer power supply temperature sensor.

4. The control system of claim 2, wherein the thermal watchdog module and the BMC are executed on a first processor of the microcontroller.

5. The control system of claim 4, wherein the thermal watchdog module comprises computer executable instructions, control commands and control data configured in accordance with communications link specification, when executed on the first processor of the microcontroller, the computer executable instructions perform following operations:
establishing communication with the dedicated thermal watchdog temperature sensor at the start up using the communications link over a management bus;
at a preset time interval according to a watchdog timer, retrieving a second temperature reading of the thermal watchdog temperature sensor;
comparing the second temperature reading of the thermal watchdog temperature sensor retrieved to a predetermined temperature threshold;
sending control commands to take the corrective actions to reduce the operating temperature of the host computer, if the second temperature reading of the thermal watchdog temperature sensor retrieved exceeds the predetermined temperature threshold; and
sending control commands to instruct the host computer to shut down, if the second temperature reading of the thermal watchdog temperature sensor retrieved exceeds the predetermined temperature threshold, and the corrective actions fail to correct the overheating.

6. The control system of claim 5, wherein the corrective actions comprise one or more of:
checking if all cooling fans installed on the host computer are working at their maximum capacity; and
rebooting the host computer to allow the rebooting of the host computer to correct the overheating.

7. The control system of claim 6, wherein the corrective actions further comprises:
reducing the power supply voltage of the host computer CPU, if the power supply voltage of the host computer CPU is not at its lowest operating limit; and
reducing the clock rate of the host computer CPU if the clock rate of the host computer CPU is not at its lowest operating limit.

8. The control system of claim 2, wherein the thermal watchdog module comprises computer executable instructions, control commands and control data configured in accordance with a communications link specification, when executed on the microcontroller the computer executable instructions perform following operations:
establishing communication with the dedicated thermal watchdog temperature sensor at the start up using the communications link over a management bus;
at a preset time interval according to a watchdog timer, retrieving a third temperature reading of the thermal watchdog temperature sensor;
comparing the third temperature reading of the thermal watchdog temperature sensor retrieved to a predetermined temperature threshold;

sending control commands to take the corrective actions to reduce the operating temperature of the host computer, if the third temperature reading of the thermal watchdog temperature sensor retrieved exceeds the predetermined temperature threshold; and sending control commands to instruct the host computer to shut down, if the third temperature reading of the thermal watchdog temperature sensor retrieved exceeds the predetermined temperature threshold, and the corrective actions fail to correct the overheating.

9. The control system of claim 8, wherein the corrective actions comprise one or more of:

checking if all cooling fans installed on the host computer are working at their maximum capacity, and increasing the speed of all cooling fans to their maximum capacity if some or all cooling fans of the host computer are not operating at their maximum capacity;

rebooting the host computer to allow the rebooting of the host computer to correct the overheating, if the number of the rebooting performed in the corrective actions does not exceed a predetermined number of reboots;

reducing the power supply voltage of the host computer CPU, if the power supply voltage of the host computer CPU is not at its lowest operating limit; and reducing the clock rate of the host computer CPU if the clock rate of the host computer CPU is not at its lowest operating limit.

10. The control system of claim 1, wherein the first temperature reading of dedicated thermal watchdog temperature sensor is retrieved using IPMI communication protocol.

11. The control system of claim 1, wherein the control commands sent to the host computer comprise IPMI control commands, and the IPMI control commands comprise a plurality of extended OEM IPMI commands.

12. The control system of claim 1, wherein the predetermined location of the host computer comprises at least one of:

a location in thermal communication with a CPU of the host computer;

a location in thermal communication with a graphical processor of the host computer;

a location in thermal communication with a power supply of the host computer; and a location in thermal communication with a temperature sensitive area designated by the manufacturer of the host computer.

13. A computer-implemented method of a microcontroller, comprising:

executing, at the microcontroller, firmware of a baseboard management controller (BMC) and firmware of a thermal watchdog module, wherein microcontroller includes a plurality of communication ports and a first communication port, wherein the thermal watchdog module is dedicated for a host computer and independent of the BMC;

managing, at the BMC, the host computer, receiving temperature readings of the plurality of temperature sensors of the host computer through the plurality of communication ports, and regulating fans associated with the host computer based on the temperature readings;

communicating, at the thermal watchdog module, with a thermal watchdog temperature sensor through the first communication port, wherein the thermal watchdog temperature sensor is installed at a predetermined location of the host computer and monitors a working temperature at the predetermined location of the host computer;

retrieving, at the thermal watchdog module, a first temperature reading of the thermal watchdog temperature sensor through the first communication port;

increasing a speed of a cooling fan of a host computer CPU;

comparing, at the thermal watchdog module, the first temperature reading of the thermal watchdog temperature sensor retrieved to a predetermined temperature threshold;

sending, at the thermal watchdog module, control commands to take corrective actions to reduce the operating temperature of the host computer and increasing a speed of the fans associated with the host computer, if the first temperature reading of the thermal watchdog temperature sensor retrieved exceeds the predetermined temperature threshold; if the first temperature reading does not exceed the predetermined temperature threshold, delaying a first predetermined time and performing the step of the receiving temperature readings of the plurality of temperature sensors;

in response to determining firstly that the first temperature reading exceeds the predetermined temperature threshold, determining secondly if the speed of the fans is in the maximum speed of the fans; if the speed of the fans is not in the maximum speed of the fans, setting the speed of the fans to the maximum speed, delaying a second predetermined time longer than the first predetermined time and performing the step of the receiving temperature readings of the plurality of temperature sensors;

in response to determining secondly that the speed of the fans is in the maximum speed of the fans, determining thirdly if the host computer is rebooted over a predetermined number of times; if the host computer is not rebooted over the predetermined number of times, incrementing counter, rebooting the host computer, delaying the first predetermined time and performing the step of the receiving temperature readings of the plurality of temperature sensors; and in response to determining thirdly that the host computer is rebooted over the predetermined number of times, sending, at the thermal watchdog module, control commands to instruct the host computer to shut down, wherein the determine firstly, the determining secondly and the determining thirdly are in a sequential order instructed by the microcontroller, and corrective actions to reduce the operating temperature of the host computer fail to correct overheating.

14. The computer-implemented method of claim 13, wherein the plurality of communication ports and the first communication port support Intelligent Platform Management Interface IPMI communication protocol.

15. The computer-implemented method of claim 14, wherein the control commands comprise IPMI control commands and the IPMI control commands comprise extended OEM IPMI commands.

16. The computer-implemented method of claim 15, wherein the corrective actions comprise at least one of:

reducing the power supply voltage of the host computer CPU, if the power supply voltage of the host computer CPU is not at its lowest operating limit; and reducing the clock rate of the host computer CPU if the clock rate of the host computer CPU is not at its lowest operating limit.

17. A non-transitory computer storage medium having computer-executable instructions stored thereon which, when executed by a microcontroller, cause the microcontroller to:

execute, at the microcontroller, firmware of a baseboard management controller (BMC) and firmware of a thermal watchdog module, wherein microcontroller includes a plurality of communication ports and a first communication port, wherein the thermal watchdog module is dedicated for a host computer and independent of the BMC;

establish communication with at least one dedicated thermal watchdog temperature sensor at the start up using IPMI communication protocol over a communications link, wherein a baseboard management controller (BMC) manages a host computer, the BMC including a first processor, and BMC firmware executed on the first processor, wherein the first processor is configured to manage, at the BMC, the host computer, receive temperature readings of the plurality of temperature sensors of the host computer through the plurality of communication ports, and regulate fans associated with the host computer based on the temperature readings;

communicate, at the thermal watchdog module, with a thermal watchdog temperature sensor through the first communication port, wherein the thermal watchdog temperature sensor is installed at a predetermined location of the host computer and monitors a working temperature at the predetermined location of the host computer;

retrieve, at the thermal watchdog module, a temperature reading of the thermal watchdog temperature sensor through the first communication port;

compare, at the thermal watchdog module, the temperature reading of the thermal watchdog temperature sensor retrieved to a predetermined temperature threshold;

send, at the thermal watchdog module, IPMI control commands to take corrective actions to reduce the operating temperature of the host computer and increase a speed of a cooling fan of a host computer CPU, if the temperature reading of the thermal watchdog temperature sensor retrieved exceeds the predetermined temperature threshold; if the temperature reading of the thermal watchdog temperature sensor retrieved does not exceed the predetermined temperature threshold, delay a first predetermined time and perform the step of the receive temperature readings of the plurality of temperature sensors;

in response to determining firstly that the first temperature reading exceeds the predetermined temperature threshold, determine secondly if the speed of the fans is in the maximum speed of the fans; if the speed of the fans is not in the maximum speed of the fans, set the speed of the fans to the maximum speed, delay a second predetermined time longer than the first predetermined time and perform the step of the receive temperature readings of the plurality of temperature sensors;

in response to determining secondly that the speed of the fans is in the maximum speed of the fans, determine thirdly if the host computer is rebooted over a predetermined number of times; if the host computer is not rebooted over the predetermined number of times, increment counter, reboot the host computer, delay the first predetermined time and perform the step of the receive temperature readings of the plurality of temperature sensors; and in response to determining thirdly that the host computer is rebooted over the predetermined number of times, send, at the thermal watchdog module, IPMI control commands to instruct the host computer to shut down, wherein the determine firstly, the determine secondly and the determine thirdly are in a sequential order instructed by the microcontroller, and corrective actions to reduce the operating temperature of the host computer fail to correct overheating.

18. The non-transitory computer storage medium of claim 17, wherein the corrective actions comprise at least one of:

reducing the power supply voltage of the host computer CPU, if the power supply voltage of the host computer CPU is not at its lowest operating limit; and reducing the clock rate of the host computer CPU if the clock rate of the host computer CPU is not at its lowest operating limit.

* * * * *